United States Patent
Kominami

(10) Patent No.: US 6,424,188 B2
(45) Date of Patent: Jul. 23, 2002

(54) SIGNAL TRANSMISSION DEVICE

(75) Inventor: Satoru Kominami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/923,950

(22) Filed: Aug. 8, 2001

(30) Foreign Application Priority Data

Aug. 10, 2000 (JP) ........................................ 2000-242005

(51) Int. Cl.$^7$ .................................................. H03K 3/00
(52) U.S. Cl. ........................................ 327/110; 327/88
(58) Field of Search ................................. 327/110, 112, 327/88, 108, 423, 424; 326/83, 87

(56) References Cited

U.S. PATENT DOCUMENTS

| | | | | |
|---|---|---|---|---|
| 4,569,011 A | * | 2/1986 | Bailey ........................ | 327/110 |
| 5,301,085 A | * | 4/1994 | Miettinen ................... | 327/108 |
| 5,416,361 A | * | 5/1995 | John et al. ................. | 327/110 |
| 6,292,035 B1 | * | 9/2001 | Takemura ................... | 326/83 |
| 6,344,768 B1 | * | 2/2002 | Daun-Lindberg et al. ... | 327/108 |

* cited by examiner

Primary Examiner—Timothy P. Callahan
Assistant Examiner—Linh Nguyen
(74) Attorney, Agent, or Firm—Arent Fox Kintner Plotkin & Kahn, PLLC

(57) ABSTRACT

In a conventional signal transmission device that transmits signals fed thereto to another device through a transformer, when the direction of the current flowing through the primary coil of the transformer is switched by switching devices connected in series between two different potentials, the timing with which the switching device that has been receiving current up to the moment is turned off is delayed from the timing with which the other switching devices are turned on or off to reduce overshoots and undershoots. This, however, may distort the square wave appearing across the secondary coil and make correct signal transmission impossible. To prevent this, a signal transmission device of the invention additionally has a waveform adjustment circuit that controls the delay time produced by a timing adjustment circuit according to changes in the states of control signals.

7 Claims, 3 Drawing Sheets

SIGNAL TRANSMISSION DEVICE

BACKGROUND OF THE INVENTION

1. Field of the Invention

The present invention relates to a signal transmission device that transmits signals fed thereto to another device through a transformer.

2. Description of the Prior Art

As an example of a conventional signal transmission device, a terminal adapter, which is needed to connect terminal equipment such as a personal computer to an ISDN (integrated services digital network) line, will be described. FIG. 4 is a diagram showing an outline of an example of a configuration that permits connection between an ISDN line and terminal equipment. A similar configuration is disclosed in Japanese Patent Application Laid-Open No. H11-330937.

As shown in this figure, to connect terminal equipment TE to an ISDN line, it is necessary to use a terminal adapter 10 that converts the signals fed thereto from the terminal equipment TE into a signal format adapted for the ISDN line and a digital service unit 20 (hereinafter referred to as the "DSU 20") that serves as a terminal interface device by converting the signals from a telephone company, which are adapted for network transfer, to signals adapted for distribution inside a household so as to be ready for bus-based wiring.

The interface I/F between the terminal adapter 10 and the DSU 20 is composed of a transformer employing coils, and the ISDN standard sets strict requirements regarding overshoots and undershoots that occur at such a signal conversion point.

FIG. 5 is a diagram showing an outline of the configuration of an example of a conventional terminal adapter 10. A logic circuit 11 that converts the signals from the terminal equipment TE into a signal format adapted for the ISDN line is connected through an output circuit 12 to the primary coil L1 of the interface I/F. The output circuit 12 feeds the coil L1 with current based on the signals output from the logic circuit 11, and the output stage of the output circuit 12 is composed of a P-channel MOS transistor QH1 and an N-channel MOS transistor QL1 that are connected in series between a supply voltage line and a GND (ground) line and a P-channel MOS transistor QH2 and an N-channel MOS transistor QL2 that are similarly connected in series between the supply voltage line and the GND line.

The drains of the transistors QH1 and QL1 are connected together through a resistor R1 to one end of the coil L1, and the drains of the transistors QH2 and QL2 are connected together through a resistor R2 to the other end of the coil L1. The sources of the transistors QH1 and QH2 are connected through constant-current source circuits CC1 and CC2, respectively, to the supply voltage line, and the sources of the transistors QL1 and QL2 are connected to the GND line. The resistors R1 and R2 both serve to limit the current that flows through the coil L1, and the constant-current source circuits CC1 and CC2 both serve to limit transient fluctuations in the current that flows through the coil L1.

The gate of the transistor QH1 is connected directly to a first output terminal O1 of the logic circuit 11, and the gate of the transistor QH2 is connected directly to a second output terminal O2 of the logic circuit 11. The gate of the transistor QL1 is connected through a timing adjustment circuit T1 to the first output terminal O1, and the gate of the transistor QL2 is connected through a timing adjustment circuit T2 to the second output terminal O2.

Here, when the logic circuit 11 outputs at its first and second output terminals O1 and O2 a H (high) level and a L (low) level, respectively, the transistors QH1 and QL2 are off, and the transistors QL1 and QH2 are on. Accordingly, the constant current produced by the constant-current source circuit CC2 flows through the transistor QH2, resistor R2, coil L1, resistor R1, and transistor QL1 to the GND line, and thus the voltage F appearing across the coil L2 is positive (in a H state).

By contrast, when the logic circuit 11 outputs at its first and second output terminals O1 and O2 a L level and a H level, respectively, the transistors QH1 and QL2 are on, and the transistors QL1 and QH2 are off. Accordingly, the constant current produced by the constant-current source circuit CC1 flows through the transistor QH1, resistor R1, coil L1, resistor R2, and transistor QL2 to the GND line, and thus the voltage F appearing across the coil L2 is negative (in a L state).

When the logic circuit 11 outputs a L level at both of its first and second output terminals O1 and O2, no current flows through the coil L1, and thus no voltage appears across the coil L2 (in a M (middle) state). It never occurs that the logic circuit 11 outputs a H level at both of its first and second output terminals O1 and O2.

Now, the operation of the timing adjustment circuits T1 and T2 mentioned above will be described. The timing adjustment circuits T1 and T2 are provided for the purpose of reducing the overshoots and undershoots that occur in the square wave appearing across the coil L1. The timing adjustment circuits T1 and T2 are so configured that, when the input thereto rises to a H level, they turn their output to a H level irrespective of a clock CLK but, when the input drops to a L level, they turn their output to a L level after counting a predetermined number of pulses in the clock CLK.

For example, in a case where the timing adjustment circuits T1 and T2 receive, as their clock CLK, the clock signal (for example, having a frequency of 6 MHz) used for the logic circuit 11, and are so configured that they turn their output to a L level in synchronism with the second rising edge in the clock CLK, the timing adjustment circuits T1 and T2 produce a delay time t of about 170 nanoseconds.

In this way, the timing adjustment circuits T1 and T2 serve to shift level switching points of the digital signals that are applied to the gates of the transistors QL1 and QL2, and desired timing adjustment can easily be achieved by using, for example, flip-flops. Thus, it is possible to produce a short delay stably, without slowing down the data transfer rate.

FIG. 6 is a timing chart showing the waveforms of signals observed at relevant points in the terminal adapter 10. In this figure, reference symbols A, B, C, and D indicate the digital signals that are applied to the gates of the transistors QH1, QL1, QH2, and QL2, respectively, and reference symbol F indicates the voltage that appears across the coil L2.

As described previously, in the terminal adapter 10 configured as described above, as shown in the figure, level switching points of the digital signals B and D applied to the gates of the corresponding transistors are shifted by the timing adjustment circuits T1 and T2. More precisely, when the individual transistors are switched between on and off, any transistor that has been receiving current from the coil L1 up to that moment is switched from on to off with a delay of t from the time point at which the other transistors are switched between on and off.

In the terminal adapter 10 configured as described above, it is possible, indeed, to reduce transient fluctuations in the current flowing through the coil L1 and thereby reduce the back electromotive force induced by the inductance of the coil. As a result, it is possible to reduce the overshoots OS and undershoots US (indicated by a dash-and-dot line in the figure) that occur in the square wave appearing across the coil L2.

However, in the terminal adapter 10 configured as described above, on occasions when the levels of the two signals output from the logic circuit 11 are switched in opposite directions, i.e. when one signal turns from a H level to a L level and simultaneously the other signal turns from a L level to a H level, the square wave appearing across the coil L2 may be distorted as indicated by reference symbol S in FIG. 6. This problem arises when the delay time t produced by the timing adjustment circuits T1 and T2 is too long, and the signal INFO1 on an ISDN line or the like is particularly prone to such distortion.

Distortion as described above of the square wave appearing across the coil L2 leads to increased jitter, which not only degrades signal transmission quality but also, in some cases, brings signals out of synchronism, making correct signal transmission impossible.

SUMMARY OF THE INVENTION

An object of the present invention is to provide a signal transmission device that can reduce overshoots and undershoots without distorting the waveform of a square wave appearing across a coil constituting a transformer.

To achieve the above object, according to the present invention, a signal transmission device is provided with: a transformer having primary and secondary coils; switching devices that are connected in series between two different potentials and that are turned on/off individually according to a control signal; a coil driving circuit that switches the direction of the current flowing through the primary coil by controlling the switching devices; a timing adjustment circuit that delays the timing with which, of all the switching devices, the one which has been receiving current up to now is turned off relative to the timing with which the other switching devices are turned on or off; and a waveform adjustment circuit that controls the delay time produced by the timing adjustment circuit according to changes in the state of the control signal.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
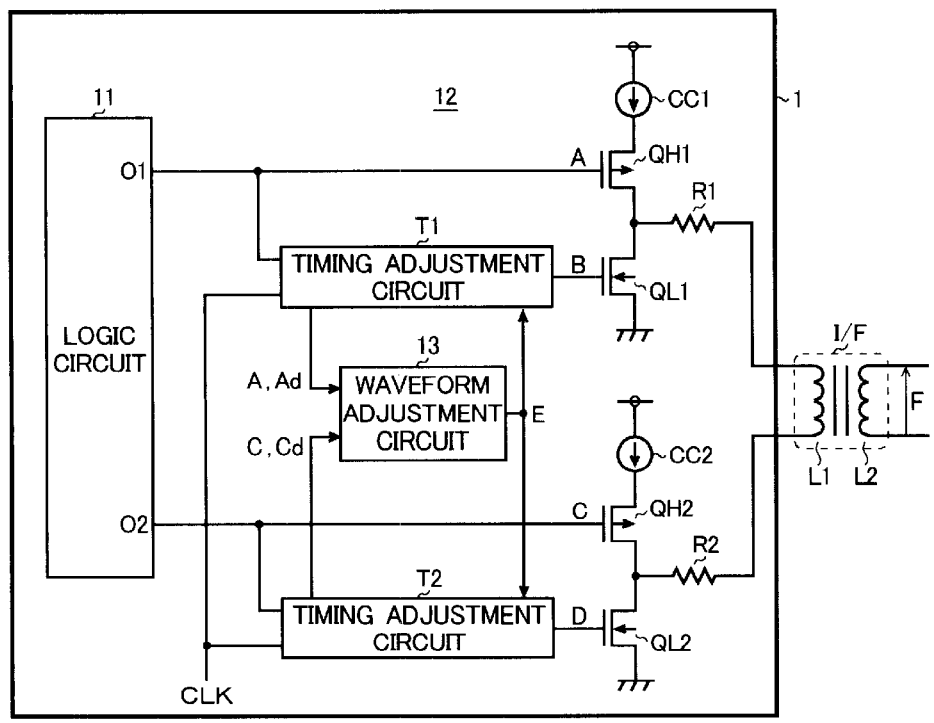
FIG. 1 is a diagram showing an outline of the configuration of a terminal adapter embodying the invention.

As an example of a signal transfer device embodying the embodiment, a terminal adapter, which is needed to connect terminal equipment to an ISDN line, will be described. FIG. 1 is a diagram showing an outline of the configuration of a terminal adapter embodying the invention.

As shown in this figure, the terminal adapter 1 of this embodiment is, as compared with the conventional configuration (see FIG. 5), additionally provided with a waveform adjustment circuit 13, which enables the terminal adapter 1 to reduce overshoots and undershoots without distorting the square wave appearing across the secondary coil L2 constituting the interface I/F.

Figure 5:
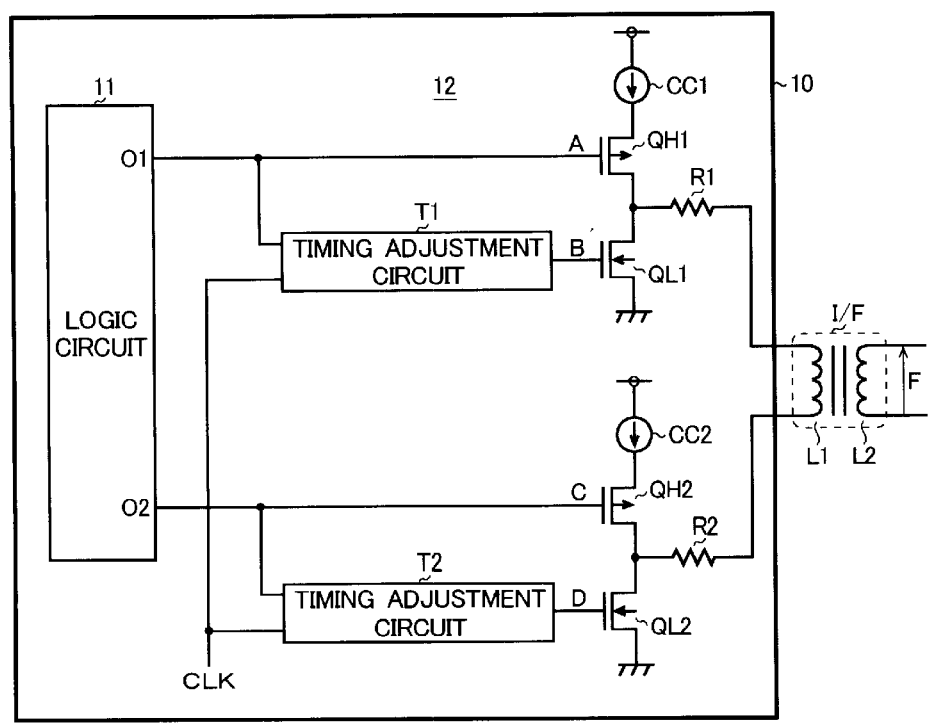
FIG. 5 is a diagram showing an outline of the configuration of an example of a conventional terminal adapter 10.
Figure 6:
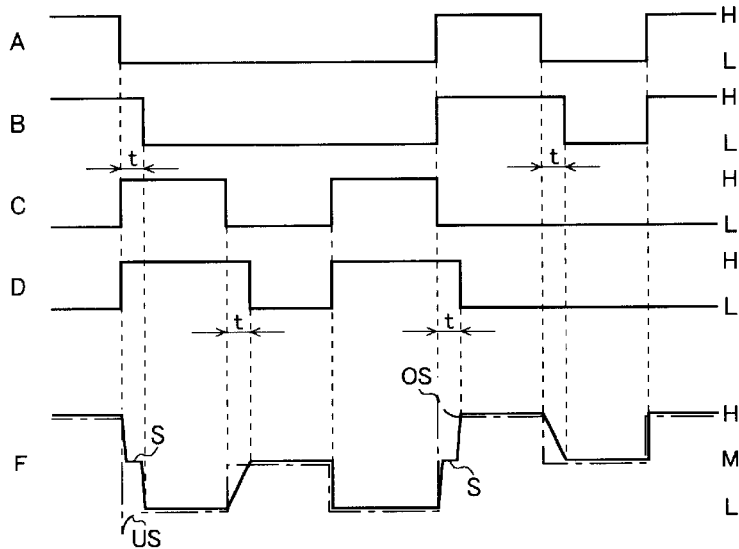
FIG. 6 is a timing chart showing the waveforms of signals observed at relevant points in the conventional terminal adapter 10.

Accordingly, here, such circuit blocks and elements as are found also in the conventional configuration shown in FIG. 5 are identified with the same reference numerals, and their explanations will not be repeated. In the following descriptions, a special emphasis is placed on the configuration and operation of the waveform adjustment circuit 13, which is the circuit block peculiar to the present invention.

Figure 2:
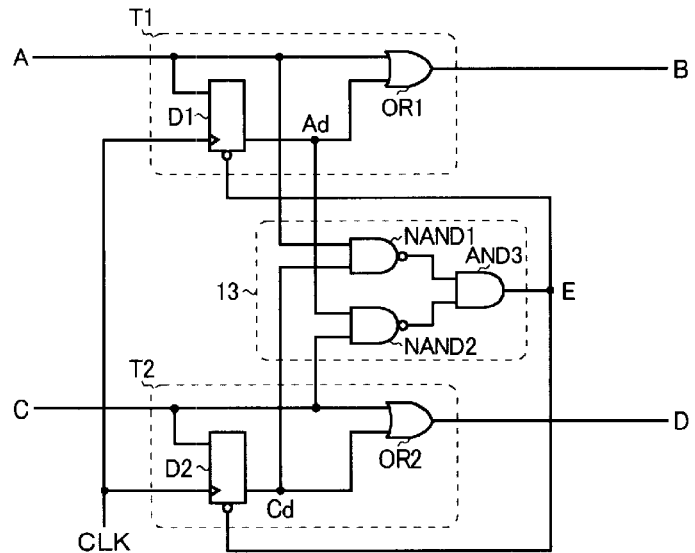
FIG. 2 is a logic circuit diagram showing an example of the configuration of the timing adjustment circuits T1 and T2 and the waveform adjustment circuit 13.

The waveform adjustment circuit 13 controls the operation of the timing adjustment circuits T1 and T2 according to the logic levels of the digital signals fed from the timing adjustment circuits T1 and T2 to the waveform adjustment circuit 13. FIG. 2 is a logic circuit diagram showing an example of the configuration of the timing adjustment circuits T1 and T2 and the waveform adjustment circuit 13.

As shown in this figure, the timing adjustment circuit T1 is composed of a D flip-flop D1 and an OR circuit OR1. The first output terminal O1 of the logic circuit 11 is connected to the data input terminal of the D flip-flop D1 and to one input terminal of the OR circuit OR1. The output terminal of the D flip-flop D1 is connected to the other input terminal of the OR circuit OR1. The output terminal of the OR circuit OR1 is connected to the gate of the transistor QL1.

Similarly, the timing adjustment circuit T2 is composed of a D flip-flop D2 and an OR circuit OR2. The second output terminal O2 of the logic circuit 11 is connected to the data input terminal of the D flip-flop D2 and to one input terminal of the OR circuit OR2. The output terminal of the D flip-flop D2 is connected to the other input terminal of the OR circuit OR2. The output terminal of the OR circuit OR2 is connected to the gate of the transistor QL2. The D flip-flops D1 and D2 both receive a common clock at their respective clock terminals.

On the other hand, the waveform adjustment circuit 13 is composed of two NAND circuits NAND1 and NAND2 and an AND circuit AND3. The first output terminal O1 of the logic circuit 11 is connected to one input terminal of the NAND circuit NAND1, and the output terminal of the D flip-flop D2 is connected to the other input terminal of the NAND circuit NAND1. The second output terminal O2 of the logic circuit 11 is connected to one input terminal of the NAND circuit NAND2, and the output terminal of the D flip-flop D1 is connected to the other input terminal of the NAND circuit NAND2. The output terminals of the NAND circuits NAND1 and NAND2 are respectively connected to the two input terminals of the AND circuit AND3, and the output terminal of the AND circuit AND3 is connected to the reset terminals of the D flip-flops D1 and D2.

Thus, the waveform adjustment circuit 13 outputs, as its output signal E, a L (low) level when the digital signal A output from the logic circuit 11 at its first output terminal O1 and the digital signal Cd (a delayed version of the digital signal C) output from the D flip-flop D2 are both at a H (high) level, or when the digital signal C output from the logic circuit 11 at its second output terminal O2 and the digital signal Ad (a delayed version of the digital signal A) output from the D flip-flop D1 are both at a H level. Otherwise, the waveform adjustment circuit 13 outputs a H level. When the output signal E turns to a L level, the D flip-flops D1 and D2 are both reset.

Figure 3:
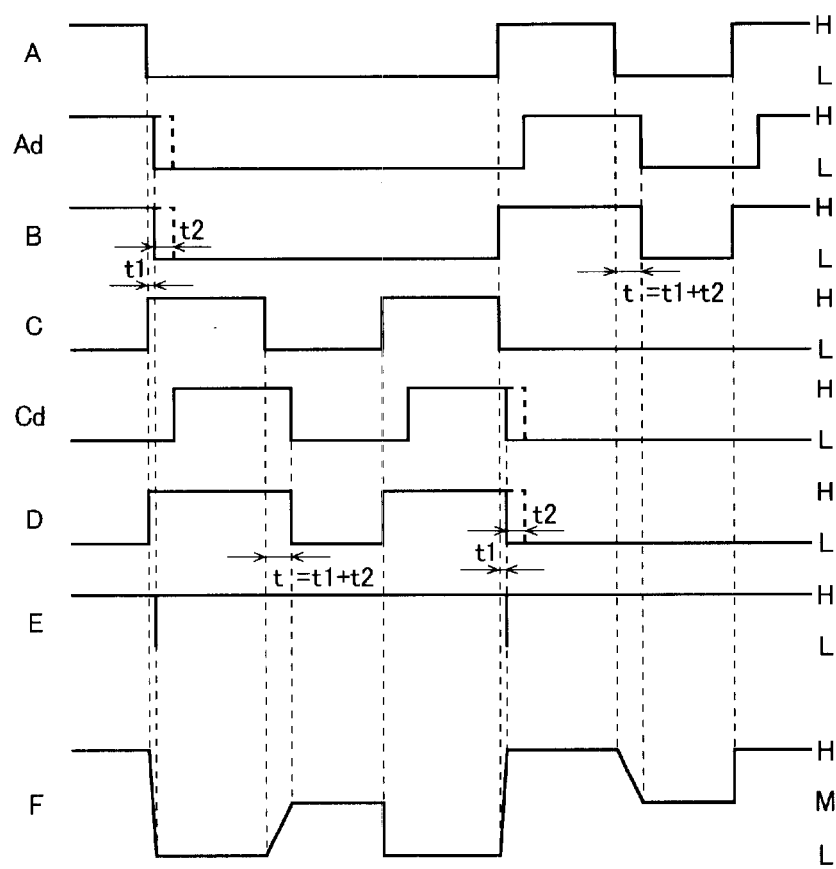
FIG. 3 is a timing chart showing the waveforms of signals at relevant points in the terminal adapter 1.
Figure 4:
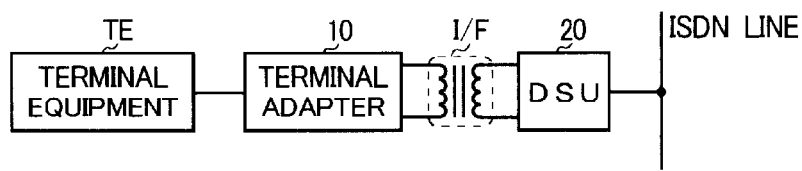
FIG. 4 is a diagram showing an outline of an example of a conventional configuration that permits connection between an ISDN line and terminal equipment.

Next, the operation of the waveform adjustment circuit 13 described above will be described in more detail with reference to FIG. 3. FIG. 3 is a timing chart showing the waveforms of signals at relevant points in the terminal adapter 1. In this figure, reference symbols A, B, C, and D indicate the digital signals that are applied to the gates of the transistors QH1, QL1, QH2, and QL2, respectively, and reference symbol E indicates the output signal of the waveform adjustment circuit 13. Reference symbol F indicates the voltage that appears across the coil L2.

As this figure shows, on occasions when the levels of the two signals (the digital signals A and C) output from the logic circuit 11 are switched in opposite directions, first the digital signal C or A turns from a L level to a H level, and then, with a delay, the digital signal Ad or Cd turns in the opposite direction. Thus, a period is produced in which both the digital signals A and Cd, or both the digital signals C and Ad, are at an H level simultaneously. As a result, as described previously, the output signal E of the waveform adjustment circuit 13 turns to a L level, resetting both the D flip-flops D1 and D2.

This circuit configuration permits the length of the delay time t produced by the timing adjustment circuits T1 and T2 to be controlled according to the logic levels of the two signals output from the logic circuit 11. Specifically, it is possible, exclusively on occasions when the levels of the two signals output from the logic circuit 11 are switched in opposite directions, i.e. when the direction of the current flowing through the primary coil L1 is inverted, to make the delay time t produced by the timing adjustment circuits T1 and T2 include only a delay time t1 (several tens of nanoseconds) based on the gate delay, which is far shorter than a delay time t2 (about 170 nanoseconds) based on the timing of the clock CLK.

In this way, by making the delay time t produced by the timing adjustment circuits T1 and T2 shorter, specifically one tenth or shorter, exclusively when the direction of the current flowing through the primary coil L1 is inverted as compared with when the current is turned off, it is possible to reduce overshoots and undershoots while minimizing distortion, unnecessary delay, and other unwanted effects in the square wave appearing across the coil L2 and thereby achieve smooth signal transmission with a minimum amount of jitter.

In the embodiment described above, as the switching devices constituting the driving circuit for the coil L1, P-channel and N-channel MOS transistors are used. This helps make the range of the voltage applied to the coil L1 as wide as the supply voltage permits and thereby maximize the range of the voltage appearing across the coil L2. However, it is also possible to use as those switching devices only N-channel MOS transistors. This helps keep the range of the voltage across the coil L1 lower than the supply voltage and thus further reduce overshoots and undershoots that occur in the coil L2.

The logic circuit 11 may be so configured as to yield only one output. In that case, the voltages applied to the gates of the individual transistors are produced by the use of an inverter circuit. The number of switching devices used may be two or more, and, as the switching devices, bipolar transistors may be used.

In the terminal adapter 1 configured as described above, by adjusting the number of inverters provided on the output side of the NAND circuits NAND1 and NAND2 or other parameters, it is possible to adjust the length of the delay time easily. It is to be understood that the present invention may be carried out with any other circuit configuration than specifically described above in connection with the embodiment, as long as it operates in a similar manner. For example, amplifiers may be connected respectively to the gates of the transistors QH1 and QH2 constituting the output circuit 12 so that the output level is adapted to comply with the standard.

What is claimed is:

1. A signal transmission device comprising:

a transformer having primary and secondary coils;

a plurality of switching devices that are connected in series between two different potentials and that are turned on/off individually according to a control signal;

a coil driving circuit that switches a direction of current flowing through the primary coil by controlling the plurality of switching devices;

a timing adjustment circuit that delays timing with which, of all the switching devices, the one which has been receiving current up to now is turned off relative to timing with which the other switching devices are turned on or off; and a waveform adjustment circuit that controls a delay time produced by the timing adjustment circuit according to changes in a state of the control signal.

2. A signal transmission device as claimed in claim 1, wherein the waveform adjustment circuit makes the delay time produced by the timing adjustment circuit shorter when the direction of the current flowing through the primary coil is inverted as compared with when the current is turned off.

3. A signal transmission device as claimed in claim 1, wherein the switching devices are MOS transistors.

4. A signal transmission device as claimed in claim 1, wherein the timing adjustment circuit comprises:

a delay device that produces a predetermined delay signal from the control signal; and an OR circuit that produces a signal which is a logical sum of the control signal and the delay signal.

5. A signal transmission device as claimed in claim 4, wherein the waveform adjustment circuit comprises:

a first NAND circuit that produces a signal which is an inverted logical product of the control signal fed to the switching device connected to one end of the primary coil and the delay signal fed to the switching device connected to another end of the primary coil;

a second NAND circuit that produces a signal which is an inverted logical product of the delay signal fed to the switching device connected to the one end of the primary coil and the control signal fed to the switching device connected to the other end of the primary coil; and an AND circuit that produces a signal which is a logical product of the signals output from the first and second NAND circuits, wherein the delay device of the timing adjustment circuit is reset by the signal output from the AND circuit.

6. A signal transmission device as claimed in claim 1, further comprising:

a logic circuit that produces, based on an input signal from an external device, the control signal with which the switching devices are controlled.

7. A signal transmission device as claimed in claim 1, wherein the signal transmission device is a terminal adapter for converting an input signal from terminal equipment into a signal format adapted for an ISDN line.

* * * * *